United States Patent [19]

Reeves

[11] Patent Number: 5,596,864
[45] Date of Patent: Jan. 28, 1997

[54] CYLINDRICAL BALE-WRAPPING MACHINE

[76] Inventor: Holdsworth Reeves, c/o H & C Garage, N. St. Eleanors Rd., R.R. #1, Miscouche, Prince Edward Island, Canada, C0B 1T0

[21] Appl. No.: 529,529

[22] Filed: Sep. 18, 1995

[51] Int. Cl.$^6$ .................................................. B65B 13/12
[52] U.S. Cl. .................. 53/399; 53/441; 53/556; 53/588
[58] Field of Search ............................. 53/588, 556, 210, 53/441, 399, 575, 576

[56] References Cited

U.S. PATENT DOCUMENTS

| | | |
|---|---|---|
| 4,024,804 | 5/1977 | Hanson . |
| 4,296,595 | 10/1981 | Meiners . |
| 4,593,518 | 6/1986 | Lancaster . |
| 4,594,836 | 6/1986 | Good ............................ 53/576 X |
| 4,672,794 | 6/1987 | Good . |
| 4,676,048 | 6/1987 | Lancaster et al. . |
| 4,694,636 | 9/1987 | Griffin ........................... 53/588 X |
| 4,697,402 | 10/1987 | Anstey et al. . |
| 4,712,354 | 12/1987 | Lancaster et al. . |
| 4,793,124 | 12/1988 | Anderson . |
| 5,012,631 | 5/1991 | Hostetler et al. . |
| 5,016,424 | 5/1991 | Stirling . |
| 5,020,299 | 6/1991 | Underhill . |
| 5,048,271 | 9/1991 | Walton . |
| 5,079,898 | 1/1992 | Springs et al. . |
| 5,152,125 | 10/1992 | Laver . |
| 5,226,269 | 7/1993 | Stoltenberg . |
| 5,392,591 | 2/1995 | Simpson . |
| 5,419,102 | 5/1995 | Inman et al. ..................... 53/576 X |
| 5,425,221 | 6/1995 | Pronovost et al. ................ 53/556 X |
| 5,465,559 | 11/1995 | Heiner et al. .................... 53/576 X |

FOREIGN PATENT DOCUMENTS

| | | |
|---|---|---|
| 1248864 | 1/1989 | Canada . |
| 1255147 | 6/1989 | Canada . |
| 1271405 | 6/1990 | Canada . |
| 1318235 | 5/1993 | Canada . |
| 2187430 | 2/1986 | United Kingdom . |

Primary Examiner—Linda Johnson
Attorney, Agent, or Firm—Ezra Sutton, Esq.

[57] ABSTRACT

A cylindrical bale-wrapping apparatus is provided having a single, rotatable bale-wrapping ring and a ram feed device for feeding unwrapped bales through such bale-wrapping ring, and, after its initial wrapping operation, into contact with a previously wrapped bale. The apparatus has a valve operated by the weight of a bale to move the bale on a feeding stroke through the bale-wrapping ring and by a valve, when the bale is at a bale-wrapping station, to rotate the bale-wrapping ring for bale-wrapping. The ram feed device also assists in moving the wrapped bale from the rear of the apparatus. The apparatus is of simple structure with a single hoop for the wrapping ring which is provided with rotation supports. A cantilever support extends longitudinally from a portion of the hoop to carry the wrap material dispenser and tensioner.

32 Claims, 6 Drawing Sheets

CYLINDRICAL BALE-WRAPPING MACHINE

BACKGROUND OF THE INVENTION

1. Field of the Invention

This invention relates to bale-wrapping apparatus.

2. Description of the Prior Art

Bale-wrapping apparatus are generally known for wrapping cylindrical bales with protective wrapping materials, e.g., synthetic plastic sheet materials. The cylindrical bales may be formed from any suitable farm-produced substances which may have been prepared for feeding farm animals. One type of wrapping apparatus which has been described wraps an individual bale which is then discharged from the apparatus. Examples of this type of wrapping apparatus were described in various patents including U.S. Pat. Nos: 4,697,402; 5,020,299; 5,048,271; and 5,079,898; and Canadian Patent Numbers: 1,248,864; 1,271,405; and 1,318,235.

In another type of apparatus, the bales were disposed in sequence in a unitary protective covering. For instance, in U.S. Pat. No. 5,392,591, a netting machine was described which wraps a net around rectangular bales using longitudinally-extending netting material. In Canadian Patent Number 1,255,147, a wrapping method was described in which a prepared tube of weatherproof material was gathered and cylindrical bales were pushed end-to-end into the tube which was caused to extend from its gathered state.

U.S. Pat. No. 5,012,631 described a self-propelled apparatus having an engine-driven infeed conveyor synchronized in speed with an output conveyor. The cylindrical bales were passed through a hoop which carried sheet-wrapping material upon a spool, the sheet-wrapping material being wrapped around the cylindrical bales to provide the covering. A problem with apparatus of this type was that the bales may not contact each other end-to-end and loose packing may result with the wrapping material extending across gaps between the cylindrical bales.

Another U.S. Pat. No. 5,152,125 described a cylindrical bale-wrapping apparatus having a hoop carrying a wrapping spool and in which the cylindrical bales were fed through the hoop by a ram as wrapping proceeded.

Yet another bale-wrapping apparatus was described in U.S. Pat. No. 4,793,124. In this particular patent, two hoops were essential to the operation of the apparatus, the hoops being concentric, one within the other, with freely rotatable wheels held between the hoops to enable rotation of one hoop while the other one was held stationary.

SUMMARY OF THE INVENTION

Aim of the Invention

The present invention seeks to provide a bale-wrapping apparatus which, while it may be of simple construction, operates automatically and efficiently.

Statements of Invention

Accordingly, the invention broadly provides a bale-wrapping apparatus comprising: a forward end portion, including front wheels and a loading zone, a rear end portion including rear wheels, and a bale-wrapping station disposed intermediate the forward end portion and the rear end portion; a single rotatable bale-wrapping ring located at the bale-wrapping station, the bale-wrapping ring extending around a longitudinally-extending pass line for the bales; a bale wrap material dispenser and a tensioner for tensioning the bale wrap material as it is being unrolled from the dispenser; a mounting for the bale wrap material dispenser and tensioner, the mounting being carried by, and being rotatable with, the bale-wrapping ring; a ram feed device at the forward end portion of the apparatus, the ram feed device being actuatable to be reciprocally-moveable intermittently between a forward position and rearward limit position in bale feeding strokes for urging unwrapped bales in succession longitudinally along the pass line, and through the bale-wrapping ring; a conveyor at the rear end portion for directing wrapped bales from the bale-wrapping ring; cooperative means for moving the apparatus forwardly; and operating means comprising: means for the detection of an unwrapped bale at the loading zone to actuate the ram feed device in a bale feeding stroke to urge the unwrapped bale towards the bale-wrapping station; means on the ram feed device to actuate an "on/off" switch to the "on" position when the ram feed device passes a first point in its bale feeding stroke to actuate a motor for causing rotation of the bale-wrapping ring to cause bale wrap material to be wrapped around a bale at the bale-wrapping station; stop detecting means for detecting when the ram feed device is at its rearward limit position and then, as a consequence thereof, automatically initiating a ram return stroke to return the ram feed device to its forward position; and means on the ram feed device to actuate the "on/off" switch means to the "off" position when the ram feed device passes the first point in its ram return stroke to stop rotation of the bale-wrapping ring.

The present invention, also provides a method is provided for wrapping a bale in a bale-wrapping apparatus which includes a forward end portion, including front wheels and a loading zone, a rear end portion including rear wheels and a bale-wrapping station disposed intermediate the forward end portion and the rear end portion, a single rotatable bale-wrapping ring located at the bale-wrapping station, the bale-wrapping ring extending around a longitudinally-extending pass line for the bales, a bale wrap material dispenser and a tensioner for tensioning the bale wrap material as it is being unrolled from the dispenser, a mounting for the bale wrap material dispenser and tensioner, the mounting being carried by, and being rotatable with, the bale-wrapping ring, a ram feed device at the forward end portion of the apparatus, the ram feed device being actuatable to be reciprocally-moveable intermittently between a forward position and a rearward limit position in bale feeding strokes for urging unwrapped bales in succession longitudinally along the pass line, and through the bale-wrapping ring, a conveyor at the rear end portion for directing wrapped bales from the bale-wrapping ring, and cooperative means for moving the apparatus forwardly, the method comprising: detecting an unwrapped bale at the loading zone and, as a consequence actuating the ram feed device in a bale feeding stroke to urge the unwrapped bale longitudinally and rearwardly along the pass line towards the bale-wrapping station; actuating an "on/off" switch to the "on" position when the ram feed device in its bale feeding stroke passes a first region, thereby causing rotation of the bale-wrapping ring to cause bale wrap material to be wrapped around a bale at the bale-wrapping station; automatically initiating a ram return stroke to return the ram feed device forwardly to its forward position when the ram feed device abuts a stop detecting means at its rearward limit position; and actuating the "on/off" switch to the "off" position when the ram feed device passes the first region in its ram return stroke to stop rotation of the bale-wrapping ring.

Other Features of the Invention

By one feature of the apparatus of this invention, the cooperative operating means comprises a lever-operated valve operated by the weight of an unwrapped bale as the bale is placed in an initial location prior to being moved in a feeding stroke of the ram feed device, operation of the lever-operated valve initiating actuation of the ram feed device in a feeding stroke to move the ram feed device rearwardly; a second valve which is actuated when the ram feed device reaches a predetermined rearward position to initiate ring rotation; and at least one further valve actuated when the ram feed device reaches its rearward limit, thereby to initiate return of the ram feed device to its forward position and to cease rotation of the ring.

By another feature of the apparatus of this invention, the lever-operated valve, upon actuation causes a slider rail to move forwardly to actuate a piston-and-cylinder assembly valve to move the ram feed device rearwardly. By yet another feature of the apparatus of this invention, the apparatus includes a star adapted to contact an actuating roller upon rearward movement of the frame structure of the ram feed device to activate a ring-rotation valve to cause the ring to rotate. By still another feature of the apparatus of this invention, the apparatus includes a bumper adapted to be contacted when the ram feed device reaches the rearward limit of its travel to initiate movement of the ram feed device forwardly, e.g., where the movement of the ram feed device forwardly is caused by a torsion spring actuated by release of a holding valve from its detent. By still another feature of the apparatus of this invention, the frame structure of the ram feeding device is adapted to contact a bumper to reset the lever-operated valve to its neutral and/or stop position.

By another feature of the apparatus of this invention, the operating means comprises a hydraulic operating system including at least one hydraulically-operated, piston-and-cylinder assembly for moving the ram feed device in the bale feeding stroke, a first hydraulic motor for rotating the bale-wrapping ring, and further hydraulic motor means for actuating auxiliary forward driving means. By yet another feature of the apparatus of this invention, the ram feed device comprises a ram head which is reciprocal between a position adjacent to the first valve and a position which is adjacent to the bale-wrapping station, the ram head thereby applying pressure against an unwrapped bale disposed at the initial location to urge it longitudinally along the pass line in a bale feeding stroke; and the hydraulic operating system comprises two piston-and-cylinder assemblies, disposed one on each side of the pass line, and operable together to balance the load applied by the ram head to the bale, e.g., wherein each piston-and-cylinder assembly is double-acting.

By yet another feature of the apparatus of this invention, the driving means includes a pair of front wheels which are pivotal to steer the apparatus, and including steering means which is operable to pivot the pair of wheels and thereby to steer the apparatus. By still another feature of the apparatus of this invention, the steering means includes an axle, a wheel steeringly-mounted at each end of the axle, a tie rod connected to the axle, and hydraulic cylinder means interconnected between the axle and the tie rod. By yet another further feature of the apparatus of this invention, the cylinder end of the hydraulic cylinder is connected to the axle and the rod end of the hydraulic cylinder is connected to the tie rod.

By yet another feature of the apparatus of this invention, the apparatus includes a lever brake which is hydraulically operable to move downwards from a non-active position to a plurality of selected active positions at which it frictionally contacts or engages the ground. By a still further feature of the apparatus of this invention, the lever brake comprises a lever pivotally-connected as a class II lever to the frame, and hydraulic means interconnected between the frame and the lever to move the lever, e.g., where the lever is adapted to drag along the ground when the apparatus is moving to act as a brake, or where the lever is adapted to lift the rear wheels off the ground.

By another feature of the apparatus of this invention, the single rotatable bale-wrapping ring comprises a single hoop, the single hoop including a structure extending longitudinally rearwardly in cantilever fashion from a selected part of the single hoop, the structure supporting the mounting for the bale wrap material dispenser and the tensioner. By a further feature of the apparatus of this invention, the apparatus includes a driving wheel, the driving wheel being in peripheral contact with the single hoop, the driving wheel being drivable by hydraulic motor means. By yet another feature of the apparatus of this invention, the peripheral surface of the single hoop is provided with a peripheral friction surface; the driving wheel includes a peripheral friction surface, and including spring means to urge the driving wheel with its friction surface into frictional contact with the peripheral friction surface of the single hoop. By still yet another feature of the apparatus of this invention, the single hoop is supported in position at the bale-wrapping station by a plurality of support wheels, the support wheels being disposed in circumferentially-spaced positions in supporting engagement with the single hoop, and being in rolling contact with an inner peripheral surface of the single hoop, the wheels of each pair being freely rotatably-mounted upon an arm. By a still further feature of the apparatus of this invention, at least two wheels are mounted on an associated arm which itself is pivotally-mounted upon an upright post of the apparatus, and including means secured to each arm for adjusting the angular position of that associated arm with respect to the upright post.

By a still further feature of the apparatus of this invention, the conveyor means at the rear end portion of the apparatus comprises a horizontally-oriented roller conveyor comprising two side-by-side rows of rollers, the rows of rollers being inclined upwardly away from each other, thereby effectively to provide a V-shaped guide support along the roller conveyor for guiding a wrapped indefinite length of bale away from the bale-wrapping station. By another feature of the apparatus of this invention, the apparatus includes a further conveyor disposed rearwardly of the roller conveyor, the further conveyor sloping downwardly to the ground and effectively providing an auxiliary planar support for the wrapped indefinite length of bale as it moves away from the bale-wrapping station.

By yet another feature of the apparatus of this invention, the cooperative means to move the apparatus forward comprises the reaction of the ram action of pushing the bales through the bale-wrapping ring, down the roller bed and the wrapped bale coming into contact with the ground.

By yet still another feature of the apparatus of this invention, the cooperative means to move the apparatus forward comprises positive drive means connected to at least one of the rear wheels.

By one feature of the method of this invention, the method includes actuating the ram feed device by means of the weight of a bale urging a lever-operated valve downwardly.

By another feature of the method of this invention, the method includes moving the ram feed device rearwardly by means of the forward moving action of a slider rail to actuate a piston-and-cylinder assembly valve.

By yet another feature of the method of this invention, the actuation is by means of a hydraulic operating system.

Generalized Description of the Invention

In more general terms, in a preferred arrangement of this invention, the operating means comprises a valve which is disposed at the forward end portion of the apparatus to be operated by the weight of an unwrapped bale as it is placed in an initial location prior to being moved in a feeding stroke of the ram feed device. The activation of this valve initiates actuation of the ram feed device in the feeding stroke. This valve at the forward end portion of the apparatus preferably is operated by a lever which normally is urged upwards into the "off" position so as to be engageable by, and be pressed downwards, by an unwrapped bale for valve operation. A further valve is operative when the bale reaches the bale-wrapping station to initiate the rotation of the bale-wrapping ring for wrapping an unwrapped bale. Yet a further valve is provided to cause the ram feed device to return to its "start" position at the forward end of the apparatus while simultaneously stopping the rotation of the bale-wrapping ring. The ram feed device may be returned to its start position ready for the next bale feeding stroke by resilient means or by means of at least one piston-and-cylinder assembly which is conveniently double-acting and causes both feeding and return strokes of the ram feed device.

In a particularly preferred arrangement, the operating means comprises a hydraulic operating system including the piston and cylinder assembly for moving the ram feed device. With the hydraulic operating system, an engine is provided which drives a hydraulic pump for operating a hydraulic motor for causing rotation of the bale-wrapping ring and for operating further hydraulic motor means for operating the auxiliary driving means.

In the apparatus, the driving means may also include a pair of front wheels which are pivotal to enable steering of the apparatus. For this purpose, a steering means is provided which is preferably operable by the hydraulic operating system. In addition to this, a lever brake may be incorporated for engaging the ground with varying degrees of pressure so as to slow forward movement of the apparatus. This brake may comprise a pivotal lever which is itself hydraulically operable. Further, this brake may serve to raise the rear of the apparatus off the ground for attaching the apparatus to a trailer hitch for transporting purposes.

In the particularly simple construction of the present invention, the wrapping ring is a single hoop. This hoop has a structure extending longitudinally from a selected part of the hoop, the structure extending in cantilever fashion from the hoop and carrying supports for mounting both the dispenser for the sheet wrap material and the tensioner.

BRIEF DESCRIPTION OF THE DRAWINGS

In the accompanying drawings.

DESCRIPTION OF PREFERRED EMBODIMENTS

Figure 1:
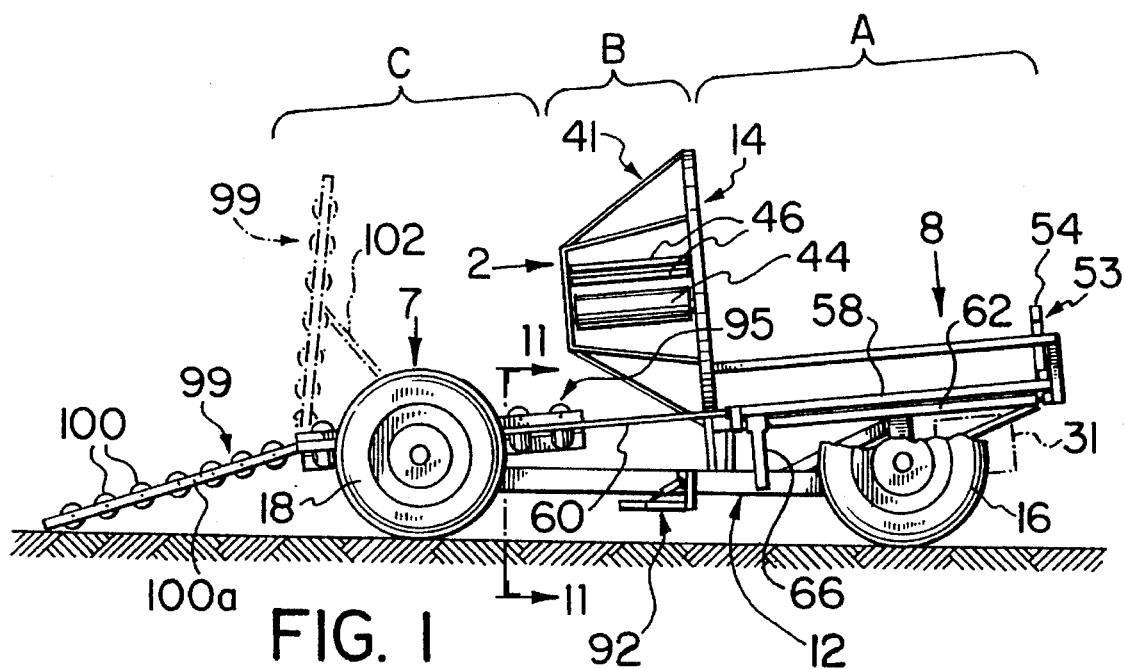
FIG. 1 is a side elevational view of a bale-wrapping apparatus of one embodiment of this invention.

Description of FIG. 1

As shown by FIG. 1, a bale-wrapping apparatus 10 for wrapping cylindrical bales of hay, straw or other farm produced materials into an indefinite length of wrapped bale material is depicted.

The apparatus 10 generally comprises a frame 12 extending from end to end of the apparatus, the frame 12 supporting a single bale-wrapping ring 14 which is disposed in a bale-wrapping station (B) intermediate a forward end portion (A) of the apparatus 10 (at the right-hand side of the ring 14) and a rear end portion (C) of the apparatus 10 (at the left-hand side of the ring 14). The frame 12 is supported above the ground by four wheels, namely, a pair of steerable wheels 16 at the forward end portion (A) of the apparatus 10 and a pair of driven wheels 18 at the rear end portion (C) of the apparatus 10.

The frame 12 also supports a bale-receiving and moving mechanism 53 (to be described in greater detail in FIGS. 6 and 7) at forward portion (A). It also supports a guiding conveyor 95 (to be described in greater detail in FIG. 11), and a discharging conveyor 99 (to be described in greater detail hereinafter). In addition, the frame 12 supports a depending braking system 92 (to be described in greater detail in FIG. 10).

The apparatus 10 includes only a single wrapping ring 14 which is in the form of a single hoop. The apparatus 10 is simple in construction while being fully hydraulically controlled for all of its operations. These operations follow automatically upon disposing of an unwrapped bale upon the front end portion (A) of the apparatus 10.

Figure 2:
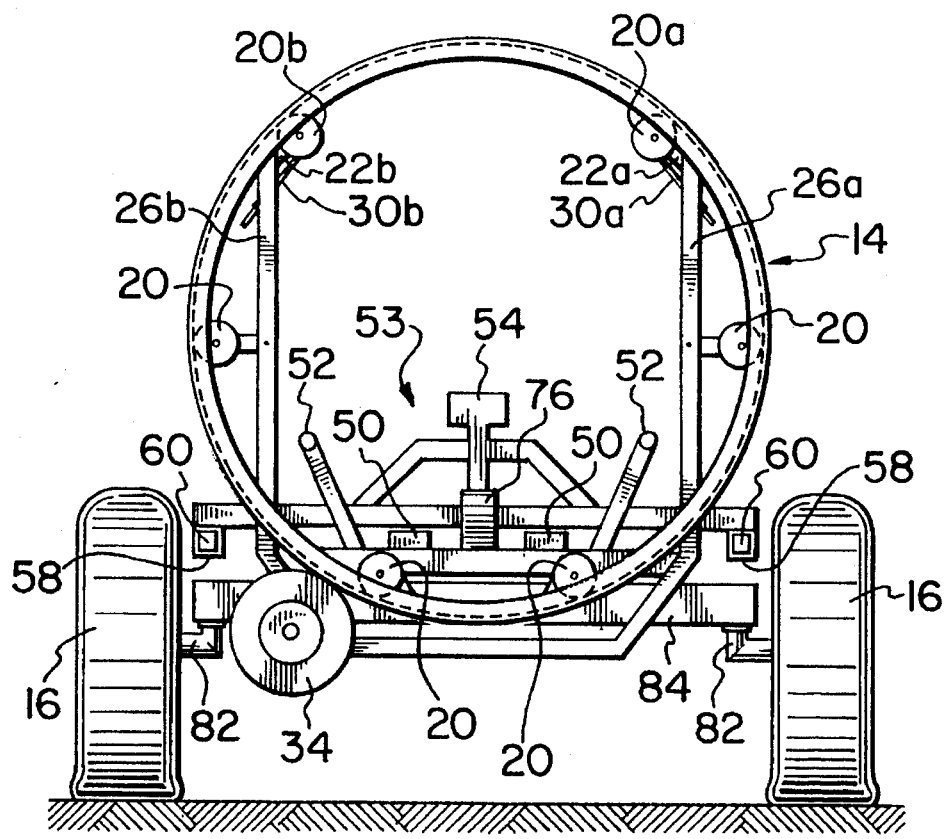
FIG. 2 is a view in the direction of arrow 2 in FIG. 1, to a somewhat larger scale and showing a bale-wrapping ring and associated elements of the apparatus.
Figure 3:
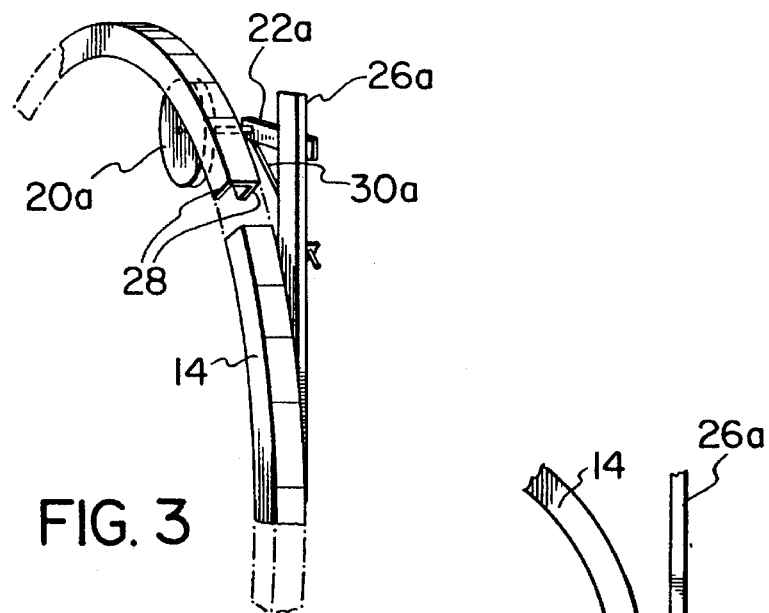
FIG. 3 is an enlarged isometric view of an upper portion of the single bale-wrapping ring.

Description of FIG. 2 and FIG. 3

In greater detail, as shown by FIG. 2, the bale-wrapping ring 14 is located in its required position at the bale-wrapping station (B) by a plurality of support wheels 20. The wheels 20 are carried in circumferentially-spaced positions with respect to the bale-wrapping ring 14. The wheels 20 are freely rotatably-mounted upon an arm 22. Wheels 20a,20b are each mounted on a pivotal arm 22a,22b on a respective upstanding right side post 26a or left side post 26b. A screw-threaded adjustment link 30a,30b extends downwardly between one end of the arm 22a,22b and the associated vertical post 26a,26b for adjusting the pivotal position of the arm 22a,22b. This adjustment ensures that both wheels 20a,20b lie in engagement with the bale-wrapping ring 14. Wheels 20 thus engage the inner peripheral surface of the bale-wrapping ring 14. Two spaced-apart side flanges 28 of the bale-wrapping ring 14 (see FIG. 3) extend radially inwards to hold the wheels between them. The bale-wrapping ring 14 is thus effectively held in operating position by an extremely simple adjustable wheel-and-arm arrangement which also is easy and quick to operate.

Figure 4:
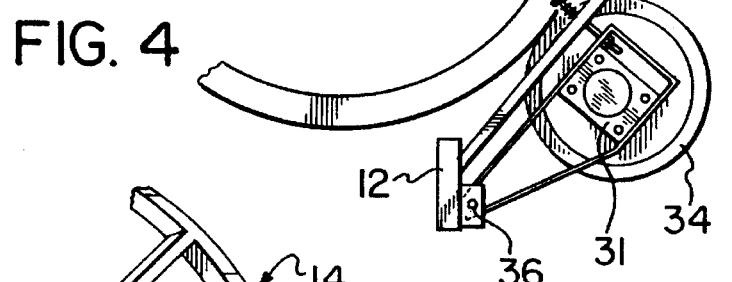
FIG. 4 is an enlarged side elevational view of the lower portion of the single bale-wrapping ring, showing the drive mechanism thereof.

Description of FIG. 4

As seen in FIG. 4, a flange 31 supports an hydraulic motor (not seen) which is driveably-connected to a driving wheel 34 which is rotatably-mounted upon a complex arm 36 pivoted around pin 38 to the frame 12 which also supports lower end 27 of vertical post 26a. A compression spring 40, connected between the complex arm 36 and the lower end 27 of the post 26a, pulls the wheel 34 upwardly into driving frictional engagement with the outer peripheral surface of the bale-wrapping ring 14. The bale-wrapping ring 14 is provided with an outer peripheral gripping surface. The wheel 34 has a peripheral surface formed from a suitable rubber or plastics material for enhancing the frictional contact characteristics with the gripping surface of the bale-wrapping ring 14.

As indicated above, the apparatus 10 is driven by an hydraulic operating system. This includes a suitable engine, e.g., a 13 HP HONDA gas engine, attached to one 15 gal/min hydraulic pump with an hydraulic fluid storage tank, as shown generally, at 31 in chain-dotted outline in FIG. 1 which is located between the front wheels. As described, the bale-wrapping apparatus 10 is of simple construction and, as will now be further described, it effectively is designed to carry a bale wrap material dispenser and a tensioner for stretching the material slightly as it is wrapped onto a bale being fed through the apparatus.

Figure 5:
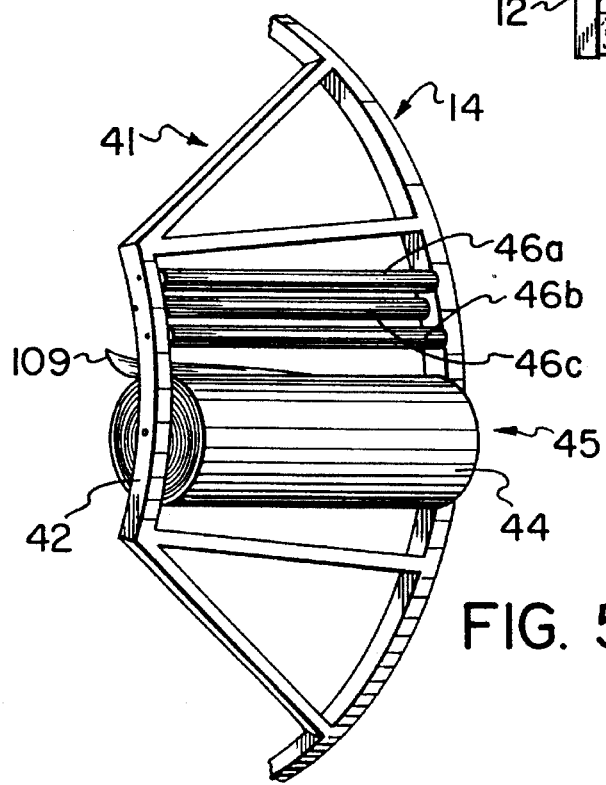
FIG. 5 is an enlarged isometric view of the portion of the single bale-wrapping ring which supports the wrapping material roll.

Description of FIG. 5

As seen in FIG. 5, the bale-wrapping ring 14, around part of its circumferential extent, is provided with a support structure 41 for the tensioner and material dispenser generally designated 45, the structure 41 extending in cantilever fashion longitudinally (i.e., rearwardly in this case) from the bale-wrapping ring 14. This structure, which is not shown in FIG. 2 for reasons of clarity, is formed as a rigid frame 41 which is welded onto a selected portion of the bale-wrapping ring 14.

A rear end arcuate member 42 of the structure 41 and the selected portion of the bale-wrapping ring 14 each carry mounting spigots (not shown) for rotatably receiving a replaceable dispenser 45 for bale wrap material 44, as shown in FIG. 5. Also rotatably-mounted between the rear end member 42 and the ring 14 are three rolls 46a,46b,46c, around which wrapping material is passed (as shown in more detail and which will be further described in FIG. 12) as it is fed onto a bale during a wrapping operation. In known manner, the rolls 46a,46b,46c may provide the tensioner in that the rolls may be geared together in such a way (not shown) that the rolls 46a,46b,46c are rotating at a peripheral speed slower than the mid roll 46c, whereby the wrapping material is stretched by contact with the mid roll as it entrains it. However, other tensioning methods may be employed. One such method may be in the form of a braking device (not shown) mounted upon the ring 14 or upon the structure 41 for resisting rotation of the dispenser thereby applying tension to the material 44 as it is being drawn off.

Figure 6:
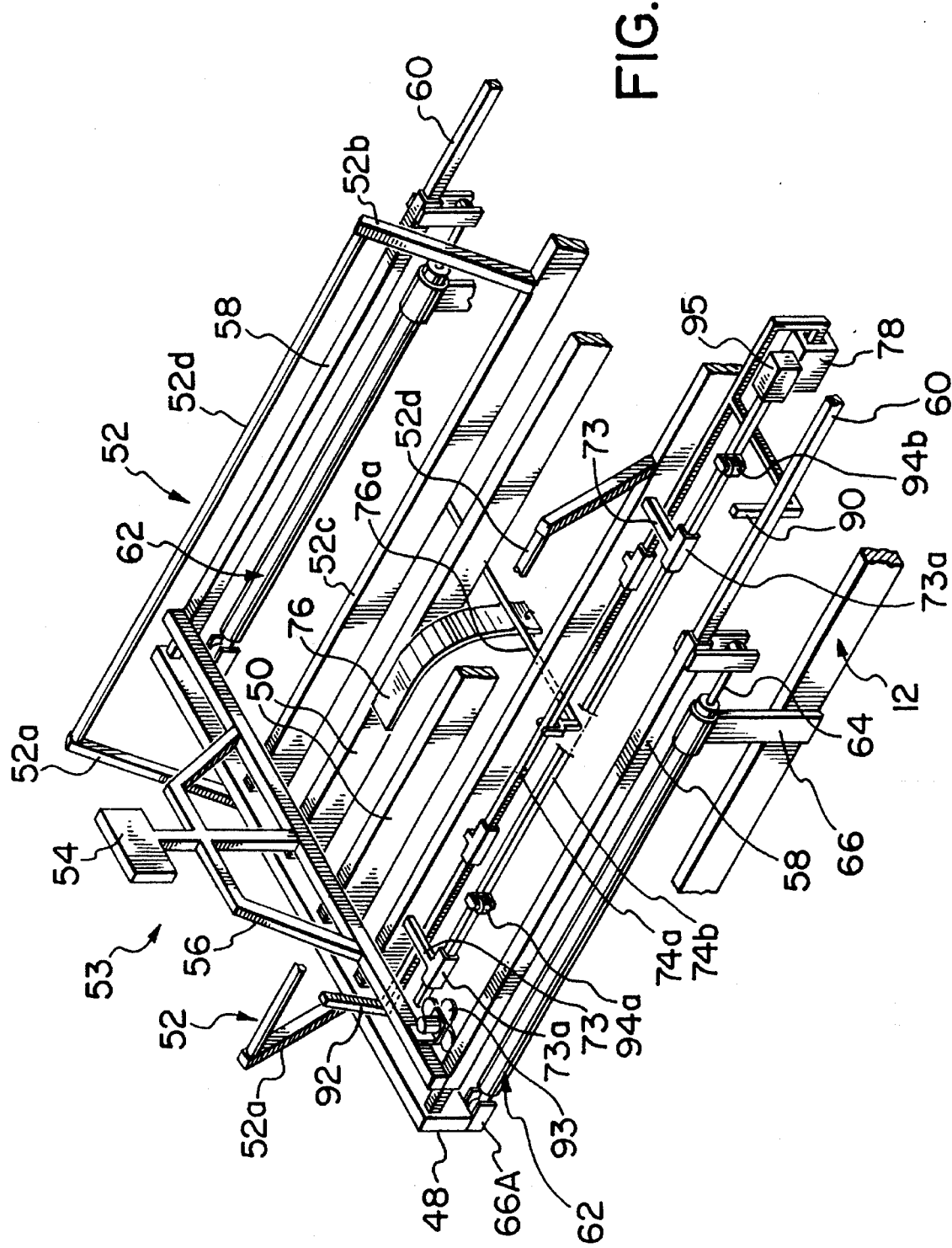
FIG. 6 is an isometric view of a forward end portion of the apparatus.
Figure 7:
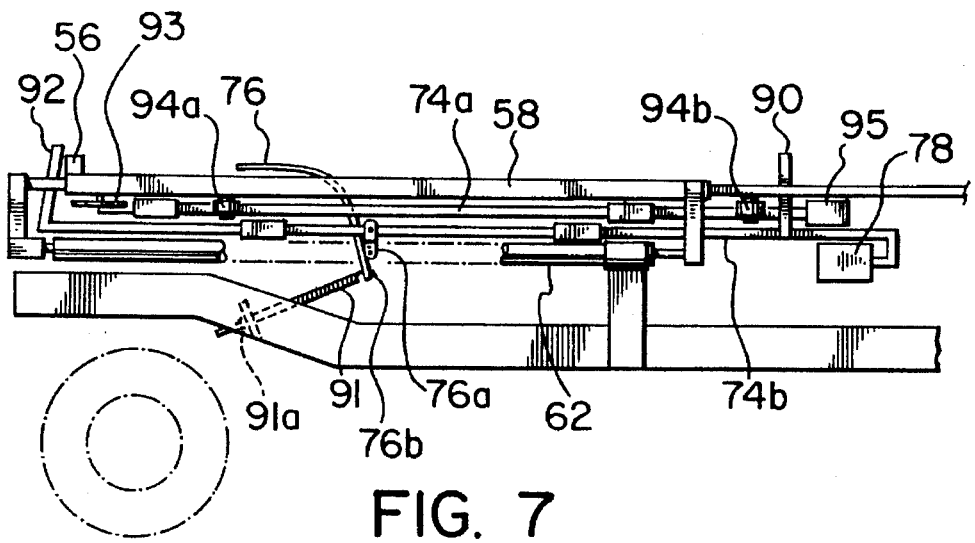
FIG. 7 is a non-central longitudinal section of a portion of the forward end portion of the apparatus.

Description of FIG. 6 and FIG. 7

The bale-receiving and moving mechanism 53 at the forward end portion (A) of the apparatus 10 will now be described with reference to FIGS. 6 and 7. The frame has transverse bed members 48, which carry longitudinally-extending rigid frame members 50 for supporting a bale as it is lowered into position at the forward end portion (A) preparatory to the bale being fed through the bale-wrapping ring 14. Above the bed are disposed two bale guides in the form of transversely spaced-apart, longitudinally-extending guide rail assemblies 52 constituted by angularly-disposed arms 52a secured to transverse supporting beam 48a, and longitudinally-spaced-apart, angularly-disposed arm 52b secured to longitudinally-extending lower guide rail 52c, and which support upper guide rail 52d. As seen, each assembly 52 is disposed one on each side of a feed path for a bale.

A ram feed device 53 is provided for moving on a bale feeding stroke to move an unwrapped bale through the bale-wrapping ring 14. This ram feed device, as shown in FIGS. 6 and 7, comprises a movable ram frame 56 provided with a centrally-located ram head 54 which is normally in a start position at the front end (A) of the apparatus 10 so as to be aligned with an end of an unwrapped bale (not seen) when this is located upon the frame members 50. The head 54 is connected by the frame structure 56 to two longitudinally-extending guide tubes 58 which telescopically receive smaller diameter guide tubes 60 which are stationary upon the frame. Mounted between the longitudinally-extending frame members is a curved operating lever 76 secured to a transverse, rotationally-supported operating rod 76a. Rod 76a is secured to a longitudinal-initiating slider rod 74a. A second longitudinal-terminating slider rod 74b is also provided. Rods 74a and 74b are guided through bushings 73a held to frame member by arm 73. At the rearward end of rod 74a is a ram valve 78, which is a forward and reverse as well as a neutral and/or start valve. At the rearward end of rod 74b is a hoop valve 95, which is a start and stop valve. Mounted on rod 74b are a pair of longitudinally-spaced-apart actuator rollers, i.e., forward actuator roller 94a and rearward actuator roller 94b. Forward actuator roller 94a starts the actuators from hoop valve 95. Rearward actuator roller 94b stops the actuator from hoop valve 95. The ram 54 abuts bumper 92, and at that forward location, a star 93 is secured to rod 74a. Curved operation lever 76 has its lower end 76b provided with a tension spring 91 secured also to an adjustment bolt 91a on the frame 12. The hydraulic operating system comprises two double-acting piston and cylinder assemblies 62 extending beneath the two guide tubes 58. A piston rod 64 of each of the double-acting piston and cylinder assemblies 62 is connected to the associated ram. Each cylinder is connected to the frame 12, front and rear, by a respective bracket 66a connected to frame 12 and bracket 66b connected to the feed ram device. The two piston and cylinder assemblies 62 balance the load applied by the ram head 54 to a bale to prevent any misalignment.

Figure 8:
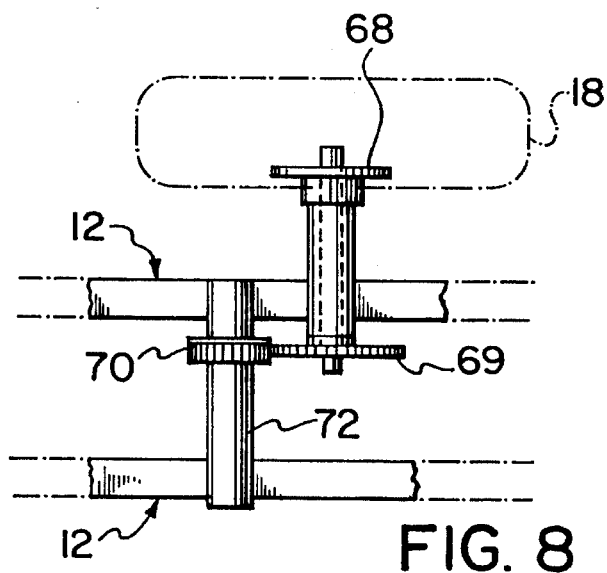
FIG. 8 is a view in the direction of arrow 7 in FIG. 1 and showing means at the rear end for driving the apparatus.

Description of FIG. 8

As seen in FIG. 8, auxiliary driving means is connected to the hydraulic operating system for driving the apparatus forwardly, but only after the wrapped bale has hit the ground. For this purpose, one or each rear wheel 18 is mounted upon a short rotatable hub 68 which concentrically carries a driven rear gear wheel 69 driveably in mesh with a smaller pitch circle diameter driving wheel 70 which is itself driven by a hydraulic motor 72 mounted upon the frame 12. The driving structure is used to propel the machine from a first line of wrapped bales to a new line of bales.

Figure 9:
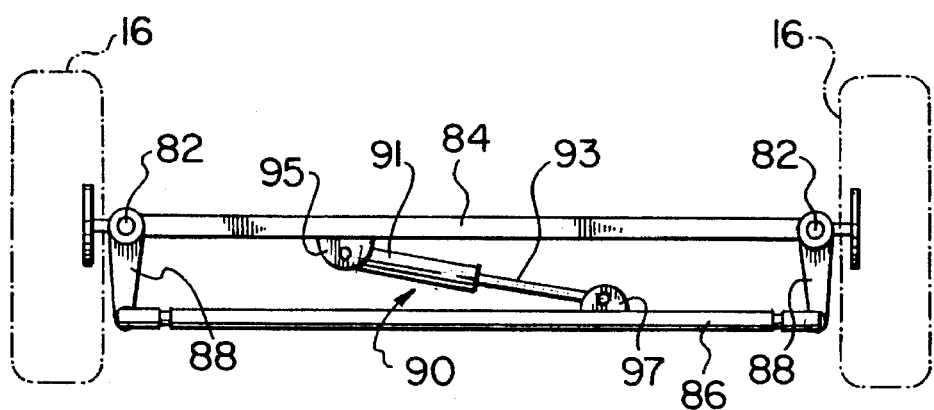
FIG. 9 is a transverse view of a part of the apparatus taken in the direction of arrow 8 in FIG. 1.

Description of FIG. 9

The apparatus 10 also includes means for steering it. As seen in FIG. 9, the forward pair of wheels 16 are pivotally-mounted upon pivotal studs 82 at two ends of a transversely-extending frame member 84. A transverse tie rod 86 extending between track rod arms 88 connected to the studs 82, is interconnected at an intermediate position with the frame member 84 by an hydraulic, double-acting piston-and-cylinder assembly 90. The cylinder end 91 of assembly 90 is pivotally-connected to ear 95, on axle 84, while the rod end 93 is pivotally-connected to ear 97 on tie rod 86. This piston and cylinder assembly 90 is connected into the hydraulic operating system by the use of a valve (not shown) operated by a person standing alongside the apparatus so that the apparatus may be steered as it moves forwardly from one bale to the next during a baling operation.

Figure 10:
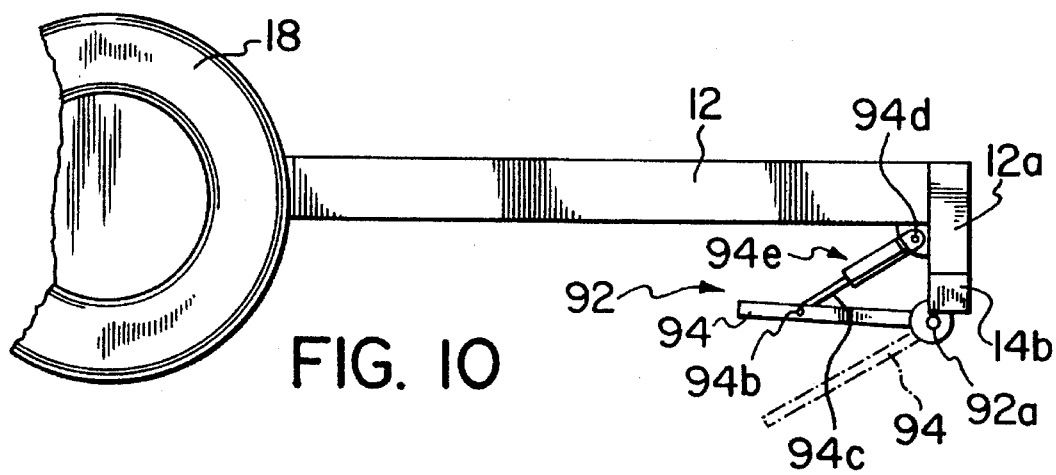
FIG. 10 is an enlarged side-elevational view of a rear part of the apparatus of FIG. 1.
Figure 11:
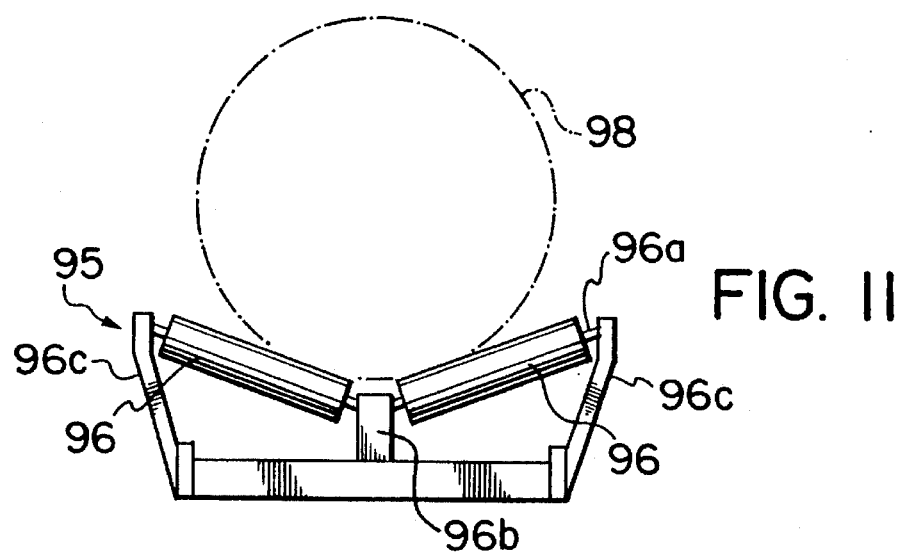
FIG. 11 is an end sectional view of the apparatus looking towards the front end portion along the lines 11—11 of FIG. 1.

Description of FIG. 10

In addition to this, the apparatus is provided with a brake which is of simple construction and is designed to engage the ground when required to slow down or stop forward movement of the apparatus. As seen more fully in FIG. 10, this brake comprises a lever brake indicated generally at 92 in FIG. 1. The lever brake 92 comprises a lever 94 which is pivotally-mounted at its fulcrum 94b as a Class II lever at one end to a longitudinally-extending member 12a of the frame 12 and in front of one of the rear wheels 18. This lever 94 is operably- and pivotally-connected at its operating point 94b to the rod end 94c of a double-acting piston and cylinder assembly 94e to apply its effort to the lever, the cylinder assembly 94e having its cylinder end 94d pivoted to the frame 12. The cylinder assembly 94e may be activated by operation of a further valve (not shown) by a person alongside the apparatus so as alternatively to lower the lever 94 or to raise it between the upper full outline and lower chain-dotted positions shown in FIG. 9. The lever 94 is of sufficient length that in its lower position it will engage the ground to retard forward motion of the apparatus. In addition, when fully extended, the lever 94 raises the rear end (C) of the apparatus 10 off the ground to enable attachment of the apparatus 10 to a trailer hitch (not shown) for transporting purposes.

The rear end portion (C) of the apparatus 10 comprises a guiding conveyor 95 for guiding an indefinite length of the bale from the bale-wrapping station, and a discharging conveyor 99 for lowering the wrapped bale material onto the ground. The conveyor 95 comprises two side-by-side rows of parallel rollers 96, with the rollers 96 in each row being inclined upwardly away from the rollers in the other row so as effectively to provide a V-shaped guide surface. The rollers are freely rotatably-mounted by axles 96a in bushings in central, horizontal end post 96b and outer support posts 96c. This position of the rollers automatically centres the wrapped bale material 98 as it passes down the conveyor and as indicated by chain-dotted outline.

Figure 13:
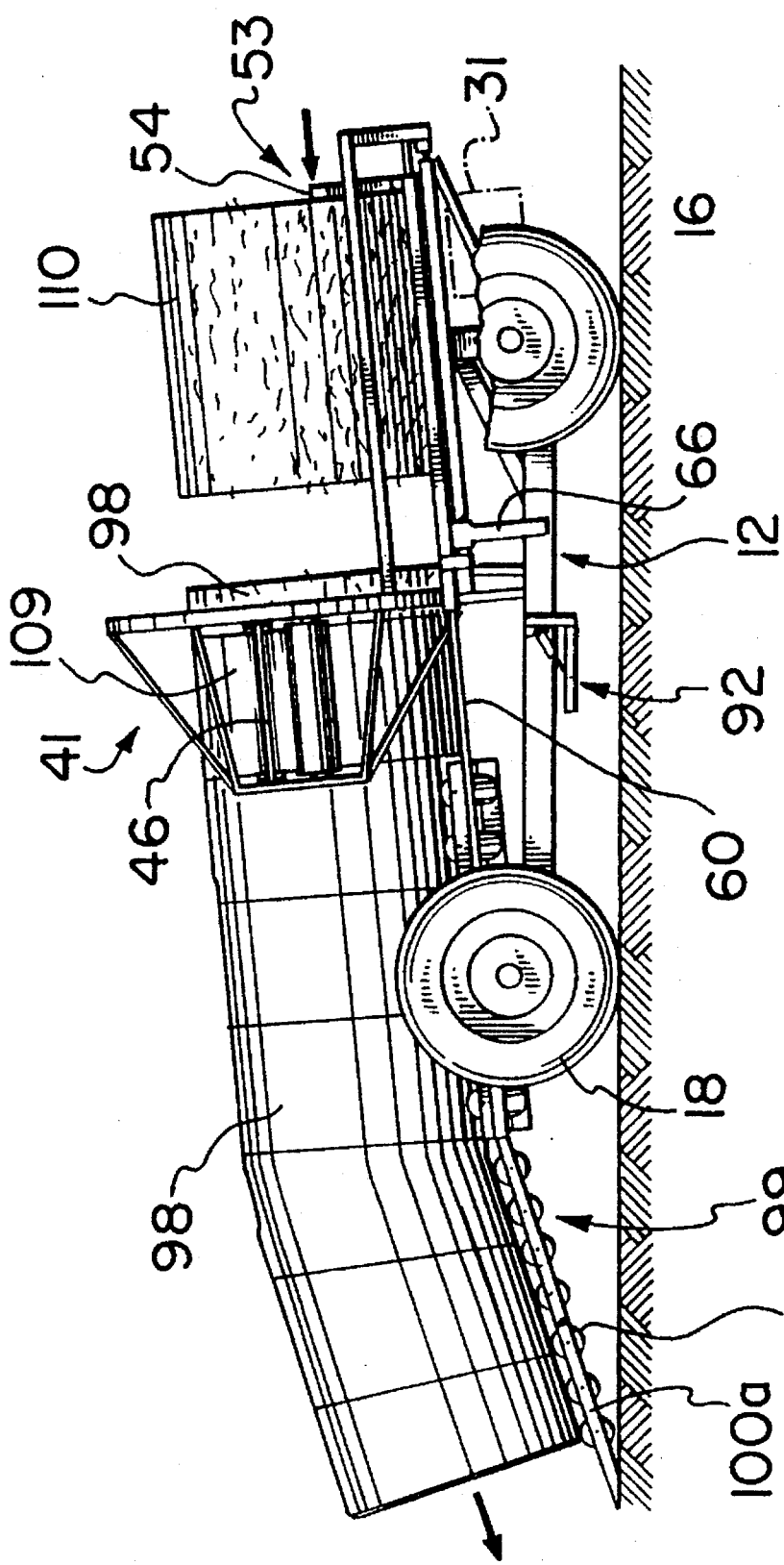
FIG. 13 is a view similar to FIG. 1 and showing the apparatus during operation.

Rearwardly of the guiding conveyor 95 is a discharge conveyor 99 provided by a single row of horizontally-disposed rolls 100 mounted by axles on bushings in parallel frames 100a (see FIGS. 2 and 13). This conveyor effectively provides an auxiliary planar support for the wrapped bale material. This part of the conveyor, in operation, will extend close to the ground at its rear end as shown in FIG. 1 in full outline, but for transportation purposes may be, and preferably is, pivoted upwards to the chain-dotted position shown in FIG. 1. It is held in its upper chain-dotted position by holding links 102 also shown in chain-dotted outline and which are pivoted to the frame structure.

OPERATION OF THE INVENTION

In the use of the above apparatus, after one bale has been wrapped, the ram feed device, in urging an unwrapped bale longitudinally and rearwardly in a feeding stroke, forces an unwrapped bale against a previously-wrapped bale and proceeds to urge the so-wrapped bale from the rear of the apparatus. This discharge provides a reaction which moves the apparatus forwardly.

The operating means comprises a plurality of valves which are operated in sequence to urge unwrapped bales through the bale-wrapping ring 14, to wrap bales as they pass through the bale-wrapping ring 14, and also to move the apparatus 10 forwardly during the wrapping and bale feeding process. The first of these valves comprises a lever operated valve 78 (shown diagrammatically in FIG. 6), the valve 78 having an operating lever 76 which normally extends upwards between the bale support frame members 50. Upon an unwrapped bale being lowered onto the members 50 behind the ram head 54, the lever 76 is depressed to move it from its neutral and/or start position causing slider rail 74a to move forwardly to actuate valve 78. This immediately actuates the piston and cylinder assemblies 62 to move the ram head 54 rearwardly in the direction of the arrow in FIG. 6 on a bale feeding stroke. The frame structure 56 of the ram feeding device moves rearwardly, thereby pushing the bale tight against a previous bale. A simultaneous reaction is caused by means of star 93 contacting actuator roller 94a which activates valve 95 causing ring 14 to go in motion to wrap the bale. When the frame structure 56 of the ram head 54 reaches the end of its travel, it contacts bumper 90 which urges valve 78 out of its detent, so that spring 91 then pulls valve 78 forwardly, thereby causing ram head 54 to move in a forward direction. Simultaneously, the star 93, which travels with the ram head 54, contacts actuator roller 94b, in which in turn activates valve 95 to stop the rotation of ring 14. The frame structure 56 of the ram 56 continues to travel forward until it contacts bumper 92 which determines neutral and/or stop position. This sets the apparatus ready for next bale.

As above procedure takes place, the wrapped bales descend onto the roller bed and eventually come into contact with the ground. The ram action of pushing bales through the ring, and down roller bed and the friction of the wrapped bales coming in contact with the ground causes a reaction. Such reaction then causes the apparatus to move in a forward direction away from the wrapped bales.

Figure 12:
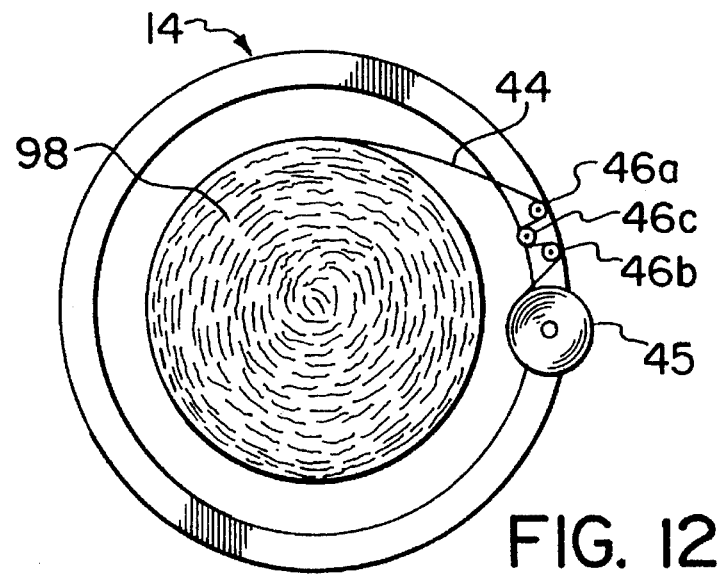
FIG. 12 is a diagrammatic view in the direction of arrow 2 in FIG. 1 showing the bale-wrapping mechanism.

As briefly described above, in operation, bale 98 is wrapped by wrapping material 44 from the dispenser 45, with the plastic wrap material 44 tensioned and passing around first roller 46b, then roller 46c and finally roller 46a, as shown diagrammatically in FIG. 12 to wrap the bale 98. After each return of the ram to the start position as shown in FIGS. 1 and 6, a next succeeding bale 110 (FIG. 13) is lowered on to the frame members 50 between the guide rails 52. During this movement, as indicated above, the lever 76 is operated to actuate the valve 78. The ram head 54 then pushes the bale 110 in the direction of the arrow in FIG. 13 towards and tightly up against the last previous-wrapped bale 98 which has been passed through the bale-wrapping ring 14 and has been wrapped. During this operation the bale-wrapping ring 14 is rotated to continue with the wrapping operation and the apparatus is driven forwardly. The action of the ram is such as to force the bale 110 against the previous bale so that a continuous indefinite length of bale material is produced and which is wrapped as it passes through the bale-wrapping ring 14. At the end of the bale feeding stroke, the switch 78 is operated to stop the rotation of the ring 14. The ram is then returned forwardly to return the ram head 54 to its initial upstream position.

CONCLUSION

As may be seen from the above description, the particular embodiment of the apparatus is simple in construction and yet operates effectively with all of the feeding, wrapping and driving of the apparatus being performed by the hydraulic operating system. In operation, after a sufficient length of wrapped bale 98 has been formed and is deposited behind the apparatus, the apparatus now moves forward. Such forward movement of the apparatus 10 effectively removes the wrapped bale material 98 from the rear of the apparatus 10 with the help of the ram head 54 applying upstream pressure to the bale. In addition, should the apparatus 10 require steering or braking in its forward movement, this is easily accomplished by an operator positioned at one side of the apparatus, actuating the appropriate valves for operating either of the piston and cylinder assemblies 90 and 94, as described above.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A bale-wrapping apparatus comprising:
    (a) a forward end portion including front wheels and a loading zone, a rear end portion including rear wheels, and a bale-wrapping station disposed intermediate said forward end portion and said rear end portion;
    (b) a single rotatable bale-wrapping ring located at said bale-wrapping station, said bale-wrapping ring extending around a longitudinally-extending pass line for said bales;
    (c) a bale wrap material dispenser and a tensioner for tensioning said bale wrap material as it is being unrolled from said dispenser;
    (d) a mounting for said bale wrap material dispenser and tensioner, said mounting being carried by, and being rotatable with, said bale-wrapping ring;
    (e) a ram feed device at said forward end portion of said apparatus, said ram feed device being actuatable to be reciprocally-moveable intermittently between a forward position and rearward limit position in bale feeding strokes for urging unwrapped bales in succession longitudinally along said pass line, and through said bale-wrapping ring;
    (f) a conveyor at said rear end portion for directing wrapped bales from said bale-wrapping ring;
    (g) cooperative means for moving the apparatus forwardly; and
    (h) operating means comprising:
        means for the detection of an unwrapped bale at said loading zone to actuate said ram feed device in a bale feeding stroke to urge said unwrapped bale towards said bale-wrapping station;
        (ii) an on/off switch and means on said ram feed device to actuate said "on/off" switch to the "on" position when said ram feed device passes a first point in its bale feeding stroke to actuate a motor for causing rotation of said bale-wrapping ring to cause bale wrap material to be wrapped around a bale at said bale-wrapping station;
        (iii) stop detecting means for detecting when said ram feed device is at its rearward limit position and then, as a consequence thereof, automatically initiating a ram return stroke to return said ram feed device to its forward position; and
        (iv) means on said ram feed device to actuate said "on/off" switch to the "off" position when said ram feed device passes said first point in its ram return stroke to stop rotation of said bale-wrapping ring.

2. Apparatus according to claim 1 wherein said operating means comprises: a lever-operated valve positioned at a neutral stop position, and operated by the weight of an unwrapped bale as said bale is placed at said loading zone prior to being moved in a feeding stroke of said ram feed device, operation of said lever-operated valve initiating actuation of said ram feed device in a feeding stroke to move said ram feed device rearwardly; a second, ring-rotation valve which is actuated to "on" when said ram feed device reaches a first position in its bale feeding stroke to initiate ring rotation of said bale-wrapping ring and which is actuated to "off" when said ram feed device reaches said first position in its ram return stroke to stop rotation of said bale-wrapping ring; and at least one further valve actuated when said ram feed device reaches its rearward limit position, thereby to initiate return of said ram feed device to its forward position.

3. Apparatus according to claim 2, said apparatus including a first actuating roller and a star mounted on said ram feed device, said star being adapted to contact said first actuating roller upon rearward movement of said ram feed device to activate said second ring-rotation valve to cause said bale-wrapping ring to rotate and to contact said first actuating roller upon forward movement of said ram feed device to deactivate said second ring-rotation valve to stop rotation of said bale-wrapping ring.

4. Apparatus according to claim 2, said apparatus including a bumper which is adapted to be contacted when said ram feed device reaches its rearward limit position to initiate movement of said ram feed device forwardly in its ram return stroke.

5. Apparatus according to claim 1, including an auxiliary forward driving means, and wherein said operating means comprises a hydraulic operating system including at least one hydraulically-operated piston and cylinder assembly for moving said ram feed device in said bale-feeding stroke, a first hydraulic motor for rotating said bale-wrapping ring, and further hydraulic motor means for actuating said auxiliary forward driving means.

6. Apparatus according to claim 1 wherein said driving means includes a pair of front wheels which are pivotal to steer the apparatus; and including steering means which is operable to pivot said pair of wheels and thereby to steer the apparatus. hydraulic cylinder, said hydraulic cylinder having a cylinder end and a rod end, said hydraulic cylinder being interconnected between said axle and said tie rod.

7. Apparatus according to claim 1 including a lever brake which is hydraulically operable to move downwards from a non-active position to a plurality of selected active positions at which it frictionally-contacts or engages the ground.

8. Apparatus according to claim 1 wherein said single rotatable bale-wrapping ring comprises a single hoop, said single hoop having an inner peripheral surface and an outer peripheral surface, said single hoop including a structure extending longitudinally rearwardly in cantilever fashion from a selected part of said single hoop, said structure supporting said mounting for said bale wrap material dispenser and said tensioner.

9. Apparatus according to claim 8 also including a driving wheel, said driving wheel being in contact with a selected peripheral surface of said single hoop, said driving wheel being drivable by an hydraulic motor.

10. Apparatus according to claim 9 wherein said selected peripheral surface of said single hoop is an outer peripheral surface, wherein said outer peripheral surface is provided with a peripheral friction surface; wherein said driving wheel includes an outer peripheral friction surface; and including spring means to urge said driving wheel with its outer peripheral friction surface into frictional contact with said outer peripheral friction surface of said single hoop.

11. Apparatus according to claim 1 wherein said conveyor means at the rear end portion of said apparatus is a horizontally-oriented roller conveyer said horizontally-oriented roller conveyor comprising two side-by-side rows of rollers, said rows of rollers being inclined upwardly away from each other, thereby effectively to provide a V-shaped guide support along said roller conveyor for guiding an indefinite length of wrapped bales away from said bale-wrapping station.

12. Apparatus according to claim 11 also including a second conveyor disposed rearwardly of said horizontally-oriented roller conveyor, said second conveyor sloping away from said horizontally-oriented roller conveyor downwardly to the ground and effectively providing an auxiliary planar support for said indefinite length of wrapped bales as they move away from said bale-wrapping station.

13. Apparatus according to claim 12 wherein said cooperative means for moving the apparatus forwardly comprises the reaction of the ram action of the consecutive actions of pushing the bales through the bale-wrapping ring, then down the roller bed and then the coming into contact of said indefinite length of wrapped bales with the ground.

14. A method of wrapping a bale in a bale-wrapping apparatus which includes a forward end portion including front wheels and a loading zone, a rear end portion including rear wheels and a bale-wrapping station disposed intermediate said forward end portion and said rear end portion, a single rotatable bale-wrapping ring located at said bale-wrapping station, said bale-wrapping ring extending around a longitudinally-extending pass line for said bales, a bale wrap material dispenser and a tensioner for tensioning said bale wrap material as it is being unrolled from said dispenser, a mounting for said bale wrap material dispenser and tensioner, said mounting being carried by, and being rotatable with, said bale-wrapping ring, a ram feed device at said forward end portion of said apparatus means on said ram feed device to actuate an on/off switch, said ram feed device being actuatable to be reciprocally-moveable intermittently between a forward position and a rearward limit position in bale feeding strokes for urging unwrapped bales in succession longitudinally along said pass line, and through said bale-wrapping ring, a conveyor at said rear end portion for directing wrapped bales from said bale-wrapping ring, and cooperative means for moving the apparatus forwardly, said method comprising:

(i) detecting an unwrapped bale at said loading zone and as a consequence actuating said ram feed device in a bale feeding stroke to urge said unwrapped bale longitudinally and rearwardly along said pass line towards said bale-wrapping station;

(ii) actuating an said "on/off" switch to the "on" position when said ram feed device in its bale feeding strokes and said actuating means thereon pass a first region, thereby causing rotation of said bale-wrapping ring to cause bale wrap material to be wrapped around a bale at said bale-wrapping station;

(iii) automatically initiating a ram return stroke to return said ram feed device forwardly to its forward position when said ram feed device abuts a stop detecting means at its rearward limit position; and (iv) actuating said "on/off" switch to the "off" position when said ram feed device and said actuating means thereon pass said first region in its ram return stroke to stop rotation of said bale-wrapping ring.

15. The method of claim 14 wherein said bale wrapping apparatus includes a valve and a lever to operate said valve, and wherein said step of actuating of said ram feed device is carried out by a bale actuating said valve by downward movement of said lever.

16. The method of claim 14 wherein said bale wrapping apparatus includes a forwardly- and rearwardly-movable slider rail and a piston-and-cylinder assembly valve, and wherein said step of moving said ram feed device rearwardly comprises moving said slider rail forwardly to actuate said piston-and-cylinder assembly valve.

17. The method of claim 14 wherein said bale wrapping apparatus includes a hydraulic operating system, and wherein said step of actuation is caused by said hydraulic operating system.

18. Apparatus according to claim 2, said apparatus including a forwardly- and rearwardly-movable slider rail, and a piston-and-cylinder assembly valve; and wherein said lever-operated valve, upon actuation, causes said slider rail to move forwardly to actuate said piston and cylinder assembly valve to move said ram feed device rearwardly.

19. Apparatus according to claim 4, said apparatus including a torsion spring held by a detent, and a holding valve; and wherein said movement of said ram feed device forwardly is caused by said torsion spring which is actuated by release from said detent by said holding valve.

20. Apparatus according to claim 2, said apparatus including a frame structure for said ram feeding device and a bumper; and wherein said frame structure for said ram feeding device is adapted to contact said bumper to reset said lever-operated valve to said neutral or stop position.

21. Apparatus according to claim 5 wherein said ram feeding device comprises a ram head which is reciprocal between a forward position adjacent to said loading zone and a rearward limit position which is adjacent to said bale-wrapping station, said ram head thereby applying pressure against an unwrapped bale disposed at said loading zone to urge said unwrapped bale longitudinally and rearwardly along said pass line in a bale feeding stroke.

22. Apparatus according to claim 5 wherein said hydraulic operating system comprises two piston-and-cylinder assemblies, one said piston-and-cylinder assembly being disposed on each side of said pass line, said piston-and-cylinder assemblies being operable together to balance a load applied by said ram head to said bale.

23. Apparatus according to claim 22 wherein each said piston-and-cylinder assembly is double acting.

24. Apparatus according to claim 6 wherein said steering means includes an axle, a wheel steeringly-mounted at each end of said axle, a tie rod connected to said axle and an hydraulic cylinder, said hydraulic cylinder having a cylinder end and a rod end said hydraulic cylinder being interconnected between said axle and said tie rod.

25. Apparatus according to claim 24 wherein said cylinder end of said hydraulic cylinder is connected to said axle, and wherein said rod end of said hydraulic cylinder is connected to said tie rod.

26. Apparatus according to claim 7, including an hydraulic cylinder interconnected between said frame and said lever brake, said hydraulic cylinder being actuatable to move said lever brake, and wherein said lever brake comprises a lever which is pivotally-connected as a class II lever to said frame.

27. Apparatus according to claim 7 wherein said lever brake is adapted to drag along the ground when the apparatus is moving, thereby to act as a brake.

28. Apparatus according to claim 7 wherein said lever brake is adapted to lift said rear wheels off the ground.

29. Apparatus according to claim 10 including a plurality of arms, a like plurality of pairs of support wheels, the wheels of each pair of support wheels being freely rotatably-mounted upon an associated one of said plurality of arms, said support wheels supporting said single hoop in position at said bale-wrapping station, said support wheels being disposed in circumferentially-spaced positions in supporting engagement with said single hoop, and being in rolling contact with said inner peripheral surface of said single hoop.

30. Apparatus according to claim 29 including an upright post, and wherein at least one said pair of said support wheels is mounted on an associated one of said support arms which is pivotally-mounted upon said upright post of said apparatus.

31. Apparatus according to claim 30 including means secured to each arm of said plurality of arms for adjusting the angular position of an associated said arm with respect to said upright post.

32. Apparatus according to claim 12 wherein said cooperative means for moving the apparatus forwardly comprises positive drive means connected to at least one of said rear wheels.

* * * * *